Sept. 22, 1936.  H. C. ROTERS  2,055,089
SURGE TIMING SYSTEM FOR ELECTROMAGNETIC DEVICES
Filed July 19, 1935  3 Sheets-Sheet 1

INVENTOR
Herbert C. Roters
BY
Hoguet, Neary & Campbell
ATTORNEYS

Sept. 22, 1936.  H. C. ROTERS  2,055,089
SURGE TIMING SYSTEM FOR ELECTROMAGNETIC DEVICES
Filed July 19, 1935    3 Sheets-Sheet 2

INVENTOR
Herbert C. Roters
BY
August, Meary & Campbell
ATTORNEYS

Sept. 22, 1936.   H. C. ROTERS   2,055,089
SURGE TIMING SYSTEM FOR ELECTROMAGNETIC DEVICES
Filed July 19, 1935   3 Sheets-Sheet 3
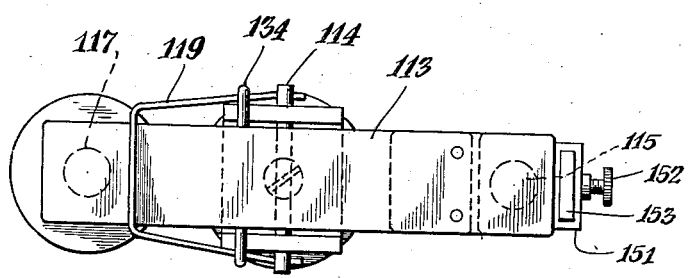
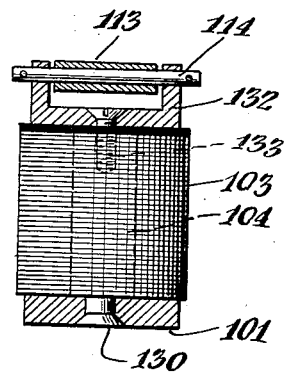
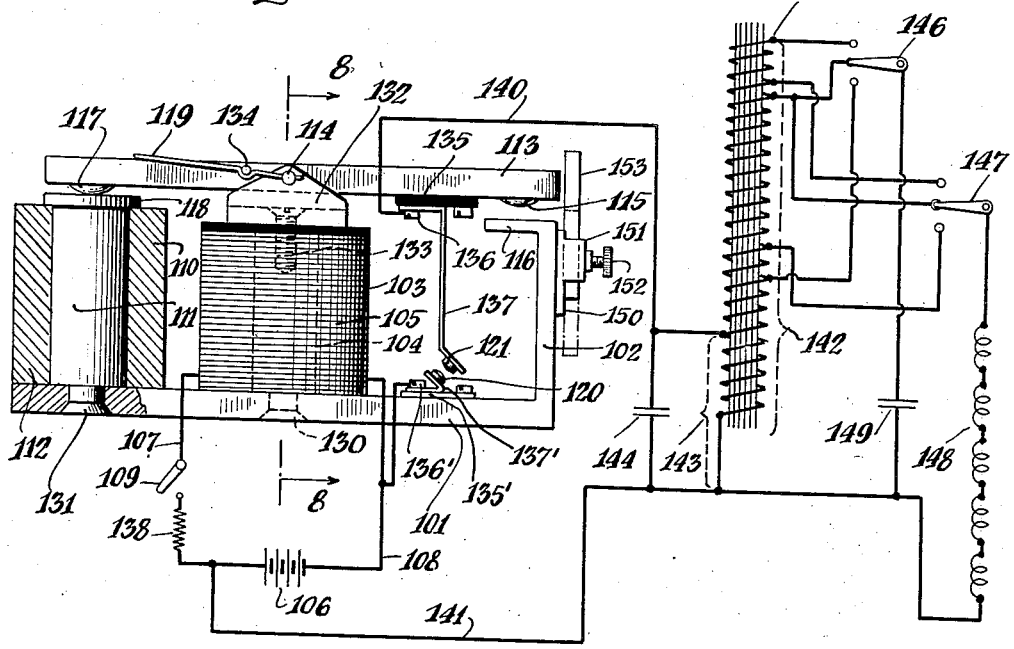
INVENTOR
Herbert C. Roters
BY
Hoguet, Neave, Campbell
ATTORNEYS Patented Sept. 22, 1936

2,055,089

UNITED STATES PATENT OFFICE 2,055,089

SURGE TIMING SYSTEM FOR ELECTROMAGNETIC DEVICES

Herbert C. Roters, Hoboken, N. J., assignor to Fairchild Aerial Camera Corporation, Woodside, N. Y., a corporation of New York Application July 19, 1935, Serial No. 32,157

27 Claims. (Cl. 95—63)

This invention relates in general to a method and apparatus for operating electromagnetic relays or electromagnets for a predetermined time duration by means of an electric surge, and more particularly for electrically operating camera shutters simultaneously for the same time duration.

One of the most serious limitations in the operation of electromagnetic camera shutters has heretofore been the difficulty of producing at the desired instant a sufficiently strong current pulse of a predetermined time duration. It has been the conventional practice to connect the shutter magnet windings in parallel to a battery through a rotary spring controlled timing switch. When making an exposure a manual control is operated to release the spring driven timing switch, causing it to connect the shutter windings across the battery for a definite time interval.

Different exposure times are obtainable by adjusting the timing switch. The disadvantage of this system is that the timing switch is very intricate and that on breaking the heavy current that flows through the highly inductive shutter windings it draws an arc which causes the time during which the shutter circuit is closed to be variable. This varies the exposure which is the very thing sought to be avoided.

Another disadvantage of the conventional systems in use is the relatively large current necessary for shutter operation. In the case of multi-lens cameras such systems have required such a large current from the low-voltage batteries, generally used for the purpose, that considerable difficulty has been experienced in keeping the shutter magnet circuit resistance low enough in order that reliable operation could be obtained. The reason for the excessive current drain necessary for operating these shutters is that in the operation of a camera shutter it is desirable to have the shutter open and close very rapidly in order to give a high shutter efficiency. In other words, the time interval during which the shutter is fully open is a large percentage of the time interval between the time the shutter leaves just start to open and just close. Rapid opening of a shutter may be obtained by making the shutter opening force relatively large compared to the spring force tending to maintain the shutter closed. However, in the case of an electromagnetic shutter the force to open it cannot be suddenly applied due to the inductance of the shutter magnet winding. This inductance prevents the current through the shutter windings from building up suddenly when the circuit to the shutter windings is closed, and hence prevents the shutter opening force from being suddenly applied. In apparatus heretofore available the only manner in which the shutter current has been made to build up rapidly for opening the shutter with great rapidity is the application of a power greatly in excess of that actually required to open the shutter.

With a surge transformer the electrical energy necessary to operate the shutters may be gradually taken from the battery and stored in the surge transformer by means of a primary winding in the transformer. Thus at the instant the exposure is made, the electrical energy stored in the transformer is discharged in the form of a current surge set up in a secondary winding which is connected to the shutter magnet windings, thus causing the shutters to operate. The time duration of the shutter operation may thus be controlled by regulating the time of discharge of the surge transformer. The regulation of the time of discharge of the surge transformer may be accomplished by connecting the shutters across various taps on the surge transformer secondary winding and by changing the effective capacitance of a condenser connected across the secondary. This gives a low power consumption from the battery and at the same time a relatively large instantaneous power output. The various parts of the circuit are designed in relation to each other so that small changes in primary current that will be produced by changes in battery voltages or by changes in the primary circuit resistance due to changes in atmospheric temperature will not affect the primary magnetomotive force necessary to produce the necessary stored energy of the air gap and saturation of the iron core.

In order to induce enough voltage in the secondary or shutter circuit to operate the shutters the stored energy of the air gap or magnetic field must collapse very suddenly and to obtain this result requires an opening of the primary circuit with a high velocity. This provides a clean break, free from arcing.

In order to effect an exposure it is first necessary to close the switch of the primary circuit of the surge transformer for a definite predetermined time interval necessary to store the required energy in the transformer and then to break the circuit, for reasons stated above. By manually operating the switch of the primary circuit it is impossible to open it with the velocity required and it is further impossible for the operator to open the primary circuit with the uniformity required to obtain the same induced voltage for each operation and to time his operations so that the exposure is made when conditions both within the camera and without are correct. In other words, the time between the closing of the primary circuit and the opening, which causes the current surge to actuate the shutters, will vary due to personal error.

One of the objects therefore of my invention is to provide a transformer that will involve a small power consumption from the electrical source and yet be capable of a relatively large instantaneous power output.

Another object is to obtain by the use of such transformer a camera shutter operating device that will have a constant high efficiency.

A further object is to provide such an arrangement wherein it is possible to control the time interval of shutter operation solely by the regulation of the time of discharge of the transformer.

A further object is to provide a switch-operating relay that will operate on any current, over a wide range of current values, in such a manner that when a convenient relay switch is closed the switch to be operated will be automatically quickly closed for a predetermined time after which it will be automatically opened even while the relay switch remains closed.

With these and other ends in view I propose to provide a shutter operating device wherein the electrical energy necessary to operate the shutters may be gradually taken from the batteries and stored in an inductance coil hereinafter referred to as a surge transformer, by means of a primary winding on the transformer. Thus at the instant the exposure is made, the electrical energy stored in the transformer is discharged by means of a secondary winding connected to the shutter magnet windings in the form of a current surge, causing the shutters to operate. The time duration of the shutter operation may thus be controlled by regulating the time of discharge of the surge transformer. In this manner I eliminate the necessity of using a spring driven timing switch and its attending disadvantages. The regulation of the time of discharge of the surge transformer may be accomplished by connecting the shutters across various taps on the surge transformer secondary winding and by changing the effective capacitance of a condenser connected across the secondary. The result is found to be a low power consumption from the battery and at the same time a relatively large instantaneous power output. In other words, there is a relatively large instantaneous input to the shutters producing very rapid shutter operation, the time duration of the shutter opening being accurately controlled by a simple apparatus having no moving parts. A further inherent advantage of the system is that as the duration of the shutter opening is decreased the instantaneous power input to the shutters is increased, thereby tending to maintain the shutter efficiency constant at a very high value.

The proposed switch-operating relay, to be used in conjunction with a surge transformer for energizing the windings of electromagnetically operated camera shutters, provides:

1. A closure of the primary circuit of sufficient length to store the necessary electrical energy within the electrical and magnetic circuits.

2. An opening of the primary circuit a definite length of time after the closure.

3. An opening of the primary circuit with a very high velocity.

4. An opening of the primary circuit that is always uniform.

5. A saving in drain upon the battery.

6. The primary circuit cannot be held closed beyond a predetermined time regardless of the length of time the winding is energized.

7. No picture can be taken accidentally.

8. Energized by a direct current of any value within a wide range.

9. The operation to be always the same and in the same sequence.

10. No action takes place after completing its cycle of operation.

Having in mind the foregoing, the nature of my invention will become more apparent upon an inspection of the following specification and appended claims, certain embodiments of my invention being illustrated in the accompanying drawings, in which:

Figure 7 is a diagrammatical view of the surge transformer and switch-operating relay in operative relationship.

Figure 8 is a view in section taken along line 8—8 of Figure 7 of the relay.

Figure 9 is a view in top plan of the relay.

Figure 1:
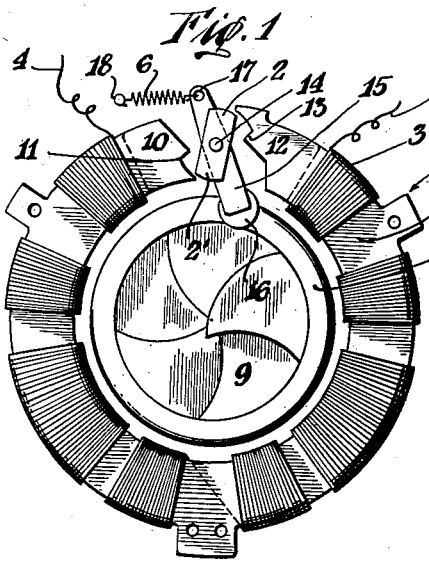
Figure 1 is a diagrammatic view in front elevation showing a leaf shutter and an electromagnetic device for operating the same.

Referring more particularly to the drawings, there is shown a camera shutter of the leaf type employing a series of overlapping leaves 9. These leaves are all connected in the conventional manner to a shutter operating ring 8 for moving the shutter leaves into open and closed positions by means about to be described.

The electromagnetic device preferably is arranged annularly about the shutter and shutter operating ring so as to constitute a compact unit. The electromagnet generally indicated at 21 consists primarily in a laminated iron core 1 with windings 3 and terminating in terminals 4 and 5. The laminated iron core is primarily circular and terminates in spaced poles 10 and 12. There is also provided a rotating armature with poles 2 and 2' pivoted about a point 14. Rigidly secured to the armature is a shutter ring operating member 15 which also moves about pivot 14 and is connected at 16 to the shutter operating ring 8. The lever 15 has connected to its opposite end 17 a tension spring 6 secured at its opposite end at 18 to some stationary member. In the position shown in Figure 1 the shutters are closed and maintained in that position by spring 6, which is so adjusted that it has a definite initial tension tending to hold the shutter leaves closed when there is no current passing through the shutter winding 3. This is necessary in order that the shutters will not open on a current less than a predetermined value. The shutter is operated by sending a current through the shutter winding 3 of sufficient magnitude so as to cause pole 2 of the armature to be attracted by pole 12 of the electromagnet and pole 2' of the armature to be attracted by pole 10 of the electromagnet. Pole 10 is provided with a shoulder 11 and pole 12 with a shoulder 13 for limiting the rotation of the armature as the latter moves into the position indicated in a clockwise direction. This movement of the armature about its pivot causes the lever 15 to be moved about the same pivot in a clockwise direction so as to move the shutter ring 8 in a counterclockwise direction and fully open the shutter leaves 9 when the armature pole 2 abuts the shoulder 13 and pole 2' abuts the shoulder 11. On interrupting the current the shutter is immediately closed by means of the tension spring 6.

Figure 2:
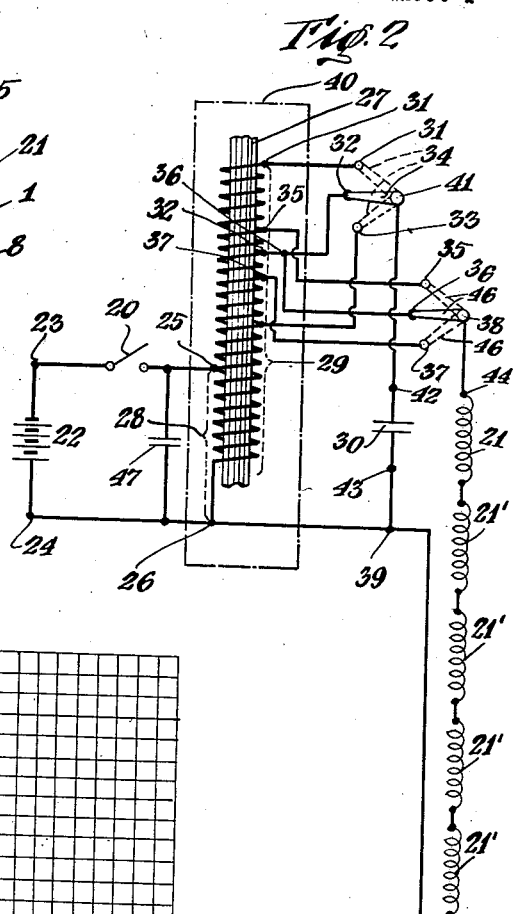
Figure 2 is a wiring diagram of the electrical surge timing system adapted for use as a control for the electrically operated shutter controlling device shown in Figure 1.

In Figure 2 there is shown a wiring diagram for a complete manually operated surge timing system arranged so as to provide for three shutter speeds. The apparatus shown in this preferred form in the box indicated at 40 is a surge transformer. This transformer consists generally of a laminated iron core 27 having an air gap, a primary winding, and a secondary winding. The primary and secondary winding may be in superimposed relationship with one another or may constitute an extension of each other. Therefore for the purpose of reference, I have merely indicated in the dotted line bracket at 28 the primary winding as extending from the tap 25 downwardly to the tap 26, and I have indicated the secondary winding by the dotted line bracket 29 showing the secondary winding to extend from the tap 31 downwardly to include all of the primary winding.

The secondary winding may be provided with taps throughout a portion of its length and indicated at 31, 32, 33, 35, 36, and 37. One end of the primary winding indicated at 26 is connected to the terminal 24 of a battery 22, while the other end of the primary winding indicated at 25 is connected to the other terminal 23 of the battery 22 through the manually operable switch 20. The primary winding is also preferably shunted by a condenser 47.

Figure 6:
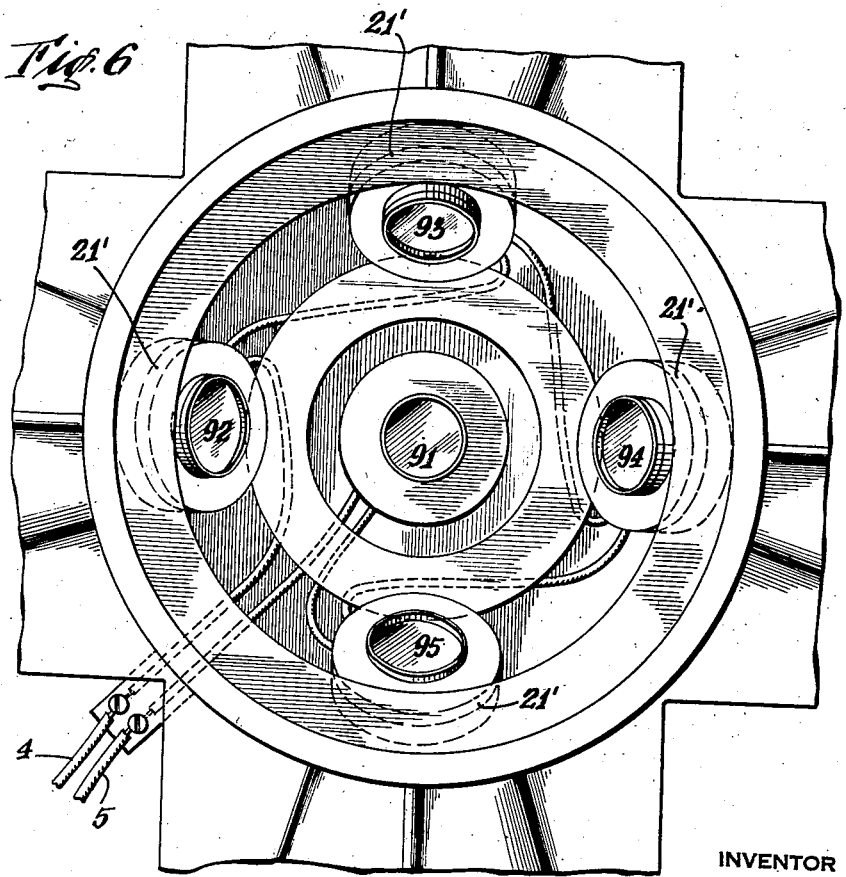
Figure 6 is a bottom plan view of a five-lens aerial camera adapted to be operated by means of the invention.

There is also provided a condenser 30 having one terminal 43 connected to one end of the secondary coil through the lead including the terminals 43, 39, and 26. The other terminal 42 of condenser 30 is connected through the terminals 42 and 41 to a rotating switch arm 34. This rotating switch arm 34 is movable about point 41 to be selectively brought into contact with taps 31, 32, and 33 extending from the secondary winding. There may also be provided electromagnetic devices arranged in series and indicated at 21' having one terminal 45 connected to terminal 26 of the secondary coil through the terminals 45, 39, and 26. The other terminal 44 of the electromagnetic devices 21 may be connected through the terminals 44 and 38 to the rotating switch arm 46. This rotating switch arm 46 is movable about the point 38 so as to be brought selectively into contact with taps 35, 36, or 37 extending from the secondary winding. In case of the operation of the shutters of a multilens camera the electromagnets 21' for operating each lens are also connected in series. The magnet 21' in Figure 2 and the magnets 21' of Fig. 6 are connected to the transformer in exactly the same manner as the electromagnets 21' are shown to be connected in Fig. 2. A separate electromagnet and a separate shutter is used for each of the five lenses 91, 92, 93, 94, and 95. For the particular arrangement of secondary taps shown in Fig. 2, there is made possible three shutter speed settings. For instance, the shutter opening setting of greatest time duration may be obtained by setting the switch arm 34 on the tap 31 and by setting the switch arm 46 on the tap 35. For the shortest speed of shutter opening, it is necessary to set the switch arm 34 on the tap 33 and the switch arm 46 on the tap 37. A third speed of shutter opening of some intermediate amount between the shortest and longest time duration may be obtained by setting the switch arm 34 on the tap 32 and the switch arm 46 on the tap 36.

With any one of these above described settings, and in order to bring about the shutter operation and a consequent photographic exposure, it is necessary to operate the primary switch 20, which may be done manually. This switch is closed for a time period sufficiently great for the primary current to rise to a substantially constant value, after which time switch 20 is suddenly opened. The sudden opening of this switch produces a current surge through the shutter magnets and causes the shutters to operate.

The primary winding of the surge transformer, indicated by the dotted line bracket at 143, is connected to the source of current supply by means of the leads 140 and 141 and the contacts 120 and 121 of the switch actuated by the relay. A condenser 144 is connected across this circuit to prevent sparking at the contacts 120 and 121. Indicated by the dotted line bracket 142 is the secondary coil on which are located a series of taps generally indicated at 145 and adapted to be used in different pairs by the movable arms 146 and 147 by which the current surge to the electromagnetic devices 148 is controlled. A condenser 149 of known capacity is indirectly connected across the electromagnetic devices.

In operation the contacts 120 and 121 are closed thus completing the primary circuit and gradually taking the necessary electrical energy from the battery and storing it in the transformer. Upon breaking of the contacts 120 and 121 this stored energy is discharged by means of the secondary winding connected to the electromagnetic devices in the form of a current surge, causing the devices to operate. The time that the devices remain in the actuated position depends upon the rate of discharge of the current surge from the secondary winding and is controlled by means of the movable arms engaging the various taps.

The switch-operating relay comprises in general a common base 101 terminating in an unshaded pole 102 having at its extreme end a pole face 116. Fixed to the base 101 is an exciting coil 103 consisting of an iron core 104 around which is wound single turns of copper wire 105. Suitably connected to the wire 105 by means of the leads 107 and 108 is a battery 106. This circuit is adapted to be opened and closed by means of the manually operated switch 109. At the other end of base 101 is another coil 110 being fixed thereto by means of the rivet 131. This coil is known as a lag coil and consists of an iron core 111 surrounded by a copper cylinder 112. The iron core 111 terminates in a pole face 113. The area of iron core 111 is greater than that of the pole 102.

Pivotally supported above the coil 103, by means of a pin 114 in a cradle 132 fixed to coil 103 by means of the screw 133, is a movable arm 113 having at either end contact points 115 and 117 which are of non-magnetic material and adapted to alternately engage the pole faces 116 and 118. The arm 113 normally remains in the position shown in Figure 7 when at rest. This position is assured by having the arm 113 heavier at this end and by means of the leaf spring 119 bearing down on the same. The spring 119 is fixed around the pin 114 and under a pin 134 so as to exert a downward force on the arm 113, thus keeping contact point 117 in engagement with pole face 118 and keeping the contact point 115 out of engagement with pole face 116. Therefore, as long as the switch 109 remains open the coil 103 is not energized and contacts 120 and 121 going to the surge transformer remain open.

Contacts 120 and 121 are fixed to arms 137' and 137 respectively and are insulated from the base and arm by means of the insulating discs 135' and 135. A resistance 138 is connected in series with the energizing circuit of the relay and serves to decrease the time constant of the energizing circuit thereby making the armature 113 respond rapidly when the switch is closed. The resistance 138 is equal or nearly equal to the resistance of the relay.

The operation of the device is as follows: the operator closes the switch 109 thus causing a current to flow through the copper wire 105 which sets up a magnetic flux in iron core 104. Owing to the lag coil on pole core 111, this flux, initially, is forced to complete its circuit by passing through the base 101, the pole core 102, the air gap between pole face 116 and the armature 113, the armature 113, and thence back to the pole core 104. The magnetic attraction thus produced between pole face 116 and armature 113 causes the armature 113 to rotate clockwise and close contacts 120 and 121 and thus close the primary circuit of the surge transformer. The contacts 121 on the arm 137 are so positioned that upon the initial movement of the arm 113 the contact points 120 and 121 engage and upon further rotation of the arm 113 a wiping effect is obtained.

As time goes on the magnetic flux of the pole core 104 will gradually distribute itself between the two pole cores 111 and 102 in proportion to the permeances of their respective magnetic paths. As this occurs the magnetic attraction upon pole face 118 which was initially zero will increase while that under pole face 116 will gradually decrease. The area of the pole core 111 and pole face 118 are so proportioned relative to those of 102 and 116 that the magnetic attraction under pole face 118 ultimately (after a predetermined time interval) becomes greater than that under pole face 116 and, therefore, armature 113 is rotated in the reverse direction and the contacts 121 and 120 are broken.

The movement of the armature 113 is extremely rapid which gives the required quick breaking of the contacts 120 and 121 necessary to prevent an appreciable part of the energy of the air gap of the transformer from being dissipated in the spark produced at the contacts 120 and 121, and thus assures the inducing of the proper voltage in the secondary coil. This rapid movement of arm 113 is due to the fact that as the contact 117 just begins its movement toward pole face 118 the contact 115 just begins to move away from pole face 116 and the instant this occurs there is a decrease in its magnetic attraction and a corresponding increase in the magnetic attraction of pole face 118 for the contact 117. This continues until the movement is complete and thus a very rapid acceleration of arm 113 is obtained.

It will be noted that as long as the coil 103 is not energized, the contacts 120 and 121 cannot be accidentally closed due to the over balancing of the arm 113 toward the coil 110 and to the spring 119 tending to keep it in this position.

It will also be noted that regardless of how long the switch 109 remains closed and thus keeping coil 103 energized, a single double rotation occurs, always the same, and in the same sequence first in one direction and then in the other and will remain in this latter position even though coil 103 remains energized, and will stay in this position after the switch 109 is opened and the energizing current of the coil 103 ceases. Therefore, there is no possibility of a double exposure. In other words, for every exposure there must be a definite sequence of operation.

The various parts of the circuit shown in Figure 2 are designed in relation to each other so as to function as follows: The magnetic circuit of the surge transformer 40 is so designed that the iron is preferably highly saturated when the air gap stores sufficient energy to operate the shutters. High saturation of the iron is desirable if the stored energy of the surge transformer and hence the exposure time are to be relatively independent of small changes in primary current that will be produced by changes in battery voltage or by changes in the primary circuit resistance due to changes in atmospheric temperature. The number of turns and resistances of the primary winding are so chosen in relation to the normal battery voltage that there will be sufficient primary magnetomotive force to produce the necessary stored energy of the air gap and saturation of the iron core. This result can be obtained by many different primary windings. A large number of primary turns will require a relatively small battery current and will produce a relatively small shutter magnet current surge on closing the primary switch 20, but will require that the surge transformer be large, and will necessitate that the primary switch 20 be held closed for a relatively long time in order that the primary current become substantially constant before making the exposure. A small number of primary turns will require a relatively large battery current and will produce a relatively large shutter magnet current surge on closing the primary switch 20 but will require only a small surge transformer and will necessitate that the primary switch 20 be held closed for only a relatively short time in order that the primary current become substantially constant before making the exposure. A good compromise is effected when the primary turns are increased to the point where the danger of a shutter opening due to the shutter magnet current surge produced on closing the primary switch has been passed with only a reasonable margin of safety. The primary winding may be made a part of the secondary as is shown in Figure 2 or it may be made a separate insulated winding. The former method reduces the weight and size of the surge transformer and increases the coupling between the primary and secondary windings.

Figure 3:
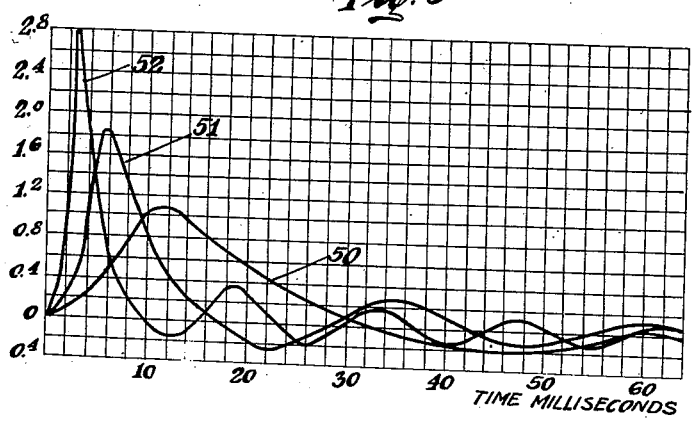
Figure 3 is an illustration in the form of graphs showing the character of the current surges through the shutters attained when employing the circuit shown in Figure 2.

Figure 3 shows the character of the shutter magnet current surges that will be obtained with the system of Figure 2 when the various parts are properly designed in relation to each other. Graph 50 shows the longest duration shutter current surge obtained when the condenser 30 is connected to tap 31 and the shutter magnets to tap 35. Graph 51 shows the intermediate duration shutter current surge obtained when the condenser is connected to tap 32 and the shutter magnets to tap 36. Graph 52 shows the shortest duration shutter current surge obtained when the condenser is connected to tap 33 and the shutter magnets to tap 37. The three graphs of Figure 3 are drawn correctly to scale relative to each other and represent surges giving approximate exposure times of 1/40, 1/60, and 1/80 second for graphs 50, 51 and 52 respectively.

The primary switch 20 must be designed to open the primary circuit very rapidly. The condenser 47 across the primary winding should be made large enough to prevent the formation of any appreciable spark on opening the contacts. Any bad sparking at these contacts is detrimental as it diverts the stored energy of the surge transformer away from the shutter magnets.

The secondary winding 29, condenser 30 and the shutter magnet windings 21 and 21' must be designed as a unit to produce a shutter current surge of the proper duration and shape. The duration of the surge is determined entirely by the natural frequency of oscillation of the entire secondary circuit comprising the surge transformer secondary 29, the condenser 30, and the shutter magnet windings 21 and 21'. The natural frequency of oscillation of this circuit can be changed in several ways: by changing the capacitance of condenser 30 but leaving it connected across a fixed number of secondary turns; by changing the number of secondary turns across which condenser 30 is connected but leaving its capacitance constant; by changing the secondary turns across which the shutter magnets are connected; or by any combination of the above three methods. The wave shape of the shutter magnet current surge is determined primarily by ratio of the inductance of the shutter magnet winding and the inductance of that portion of the secondary winding across which the shutter windings are connected, and by the resistance of the various windings of the secondary circuit. Mathematically, the wave of current through the shutter magnets consists of the sum of a damped sinusoidal current and an exponential current. The damping factors of both components of the curve are determined by the effective resistances of the secondary and shutter magnet windings. The relative value of the damping factor of each component, however, is determined by the ratio of the inductance of the shutter magnet winding to the inductance of that portion of the secondary winding across which the shutter magnet winding is connected.

Figure 4:
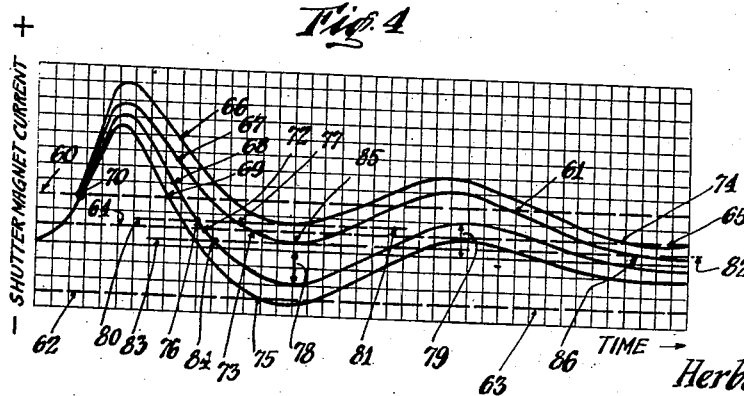
Figure 4 is an illustration in the form of graphs showing the effect on the wave shape of the shutter magnet current surge of changing the constants of the circuit of Figure 2.

The importance of the ratio of the shutter magnet winding inductance to that of the portion of the secondary winding across which the shutter windings are placed, in determining the wave shape of the shutter magnet current surge and hence on the operating characteristic of the shutters can be seen by referring to Figure 4. In this figure shutter magnet currents are represented by the ordinates and time by the abscissa. Four shutter current wave forms, all drawn for the same resistance in the various windings of the secondary circuit are shown. Wave 66 shows the result of making the inductance of the shutter magnet windings small compared to the inductance of that portion of the secondary winding across which the shutter windings are connected, and wave 69 shows the result of making the inductance of the shutter magnet winding large compared to the inductance of that portion of the secondary winding across which the shutter windings are connected. Waves 67 and 68 are for inductance ratios between the extremes of those for waves 66 and 69. Line 60—61 shows the value of shutter current in the positive direction required to just make the shutters open, and line 62—63 shows the corresponding current in the negative direction. Line 64—65 shows the value of shutter current at which the shutters just release and are closed by the spring force.

Wave shape 68, where the amplitude 78 of the first negative lobe is equal to the amplitude 79 of the second positive lobe is the best shape for practical use. This wave will cause the shutter to start opening at point 70 and to release at point 72. The maximum values of the current of the first negative lobe and the second positive lobe are equidistant from the shutter opening current lines 62—63, and 60—61 respectively and hence allows the minimum possible values of damping to be used consistent with the greatest factor of safety against double exposures due to the first negative lobe or the second positive lobe touching the shutter opening current values. Wave 66 is an extreme case where the first negative lobe does not reach the shutter release line 64—65 until the second negative lobe at point 74. Wave 67 is unsatisfactory because it results in unreliable shutter timing. Thus, normally this wave will allow the shutters to release at point 73. If the shutter release current is increased to the value shown by the line 80—81 the shutters will release at point 77, causing the shutter opening to be less by the time interval between 73 and 77. If wave 68 is used the same increase in shutter release current will cause the shutter opening to decrease by the time interval between 72 and 76 which is considerably less. Should the shutter release current decrease to the value shown by the line 82—83, the shutter opening will be increased by the time interval between 73 and 85 or possibly even the time interval 73—86, both of which are considerably greater than the time interval 72—84 which would be the increase in shutter opening if wave 68 is used instead. Actually this is very important in practice when several shutters are operated simultaneously, because the shutters will differ slightly in their release currents due to slight differences in adjustment and differences in the tension of the closing springs, and if a wave shape such as 67 is used the various shutters will have widely different exposure times. Wave 69 is unsatisfactory because it results in a second shutter opening at point 75, thereby producing a double exposure. The ratio of the inductance of the shutter windings to that of the portion of the secondary across which the shutters are connected should therefore be adjusted to give the shape of wave 68 where the amplitude of the first negative lobe and second positive lobe are equal. The height of these lobes can be adjusted by changing the effective resistance of the entire secondary circuit. Decreasing the value of this resistance will cause the amplitudes of these lobes to be greater, but will at the same time increase the amplitude of the first positive lobe or working surge. The best value of resistance of the entire secondary circuit, therefore, is one which will make the maximum values of the first negative and second positive lobes miss the shutter opening current lines by a reasonable factor of safety. It will be seen that the waves of Figure 3 for all three exposure times have a shape similar to that of wave 68 of Figure 4. This desirable result is obtained by increasing the ratio of the shutter magnet winding inductance to that of the secondary winding across which it is connected as the exposure time is shortened by increasing the natural frequency of oscillation of the secondary circuit. It is for this reason that the shutter magnet 21 of Figure 2 is connected successively across taps 35, 36 and 37 of the secondary winding as the exposure time is decreased.

The capacitance of the condenser 30 of Figure 2 is so chosen that when it is connected across the total secondary turns the longest desired exposure is obtained. As the total number of secondary turns are increased the required capacitance of condenser 30 is decreased and the maximum surge voltage across the condenser is increased. Economically, the total secondary turns, unless limited by the shutter magnet requirement regarding wave shape previously noted, should be so chosen that condenser 30 has a maximum surge voltage of about equal to its rated working voltage. The other taps for condenser 30, namely 32 and 33 of Figure 2, are chosen so as to obtain the other desired exposure times with the value of capacitance already chosen for the longest exposure, and the corresponding shutter magnet taps, namely 36 and 37, previously picked for these other desired exposure times.

Figure 5:
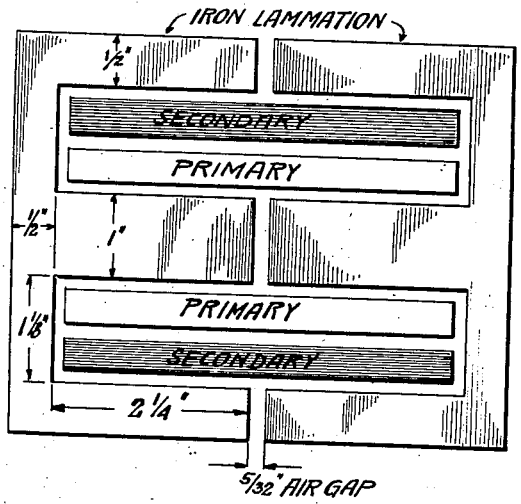
Figure 5 is a diagrammatical showing of a cross section taken through the surge transformer showing the relationship in a particular example of the windings and the core.

As an example of an actual design of the circuit of Fig. 2 proportioned in accordance with the preceding discussion the following is typical: In Figure 5 is shown a cross section of the surge transformer showing the type and dimensions of the lamination and the arrangement of the windings. The iron core is made of a stack of No. 29 U. S. S. gauge high-silican steel laminations of the dimensions shown, having a compressed stack height of 1.5 inches. The air-gap length between the halves of the iron core is $\frac{3}{32}$ inch. The primary winding consists of 504 turns of No. 15 A. W. G. enamel wire and has a resistance of approximately 1.0 ohm at 20 degrees centigrade. Over the primary winding there is wound another coil of 1796 turns of No. 24 A. W. G. enamel wire which has a resistance of approximately 44 ohms at 20 degrees centigrade. The total secondary winding is obtained by connecting the primary winding in series with second mentioned coil as indicated in Figure 2. The total secondary winding will then have 2300 turns. Referring to Figure 2 and using terminal 26 as a datum point, tap 31 is brought out at 2300 total secondary turns, tap 32 at 1165 secondary turns, tap 33 at 606 secondary turns, tap 35 at 1672 secondary turns, and tap 36 at 1165 secondary turns, and tap 37 at 974 secondary turns. The condenser 30 has a constant capacitance of 40 microfarads. The shutter magnets 31 consist of five shutters of the type of that of Figure 1 connected in series. Each shutter has 1800 turns of No. 31 A. W. G. single silk covered enameled wire, having a resistance of approximately 30 ohms at 20 degrees centigrade. The shutter core consists of a stack of No. 29 U. S. S. gauge high silicon steel laminations having an inside diameter of 1⅝ inches and an outside diameter of 2⅜ inches and a stack height of ¼ inch. The rotating armature of each shutter is made of a piece of high silicon steel 0.109 inch thick, 0.375 inch long and 0.284 inch high, shaped as shown in Figure 1. The condenser 47 used across the surge transformer primary is of 8 microfarads capacitance.

This apparatus when connected as shown in Figure 2 produced the shutter current surges shown in Figure 3 when the primary current was constant at 10.6 amperes before opening switch 20, and with the condenser 30 and shutter magnets 21 connected to the correct taps as indicated in the description of Figure 3. It will be noted that for wave 52 the amplitude of the first negative lobe is slightly less than that of the second positive lobe. This can be remedied by connecting the shutter magnets across a few less secondary turns than the value of 974 actually used in making this oscillogram.

As an added refinement to the invention, and for the purpose of obtaining a variable time interval in the operation of the relay switch-operating device, I may attach to the arm 102 a collar 150 hollowed out to receive a relatively sliding member 153, movable vertically within the collar 151. This member 153 by any suitable means may be movable either upwardly or downwardly and held in the adjusted position by means of the thumb screw 152. As the slidable metal bar 153 is moved upwardly or downwardly on the pole 102, there is created a varying fringing flux, which either assists or impedes the rotation of the armature 113, depending upon the position of the adjustable bar 153. For instance, as shown in Figure 7 in full lines the bar 153 is shown in its upper position. In this position a fringing flux is created above the armature 113 so as to materially assist in the counterclockwise rotation of the armature 113, at the proper time for such rotation to take place, as previously explained. It follows that if the bar 153 is adjustable to a position so that its upper extremity is below the armature 113, as shown in dotted lines, the fringing flux created will have an opposite effect upon the counterclockwise rotation of the armature 113. In other words, when in this position, as shown in dotted lines, the bar 153 has a tendency to impede or resist the above described counterclockwise rotation of the armature. This means for creating the fringing flux may also take the form of a rotatable cam or the like, similar to a leaf of a condenser unit for varying the capacity of the condenser. Whatever form this particular means takes, it follows that as the bar or cam is moved so as to project above the top of the pole 102, a fringing flux is set up between the armature 113 and the bar which assists in the rotation of the armature in a counter-clockwise direction, and consequently the time interval involved in the opening of the contacts 120 and 121 is definitely and predeterminedly shortened. Should the bar be below the top of the pole 120, a fringing flux is set up between the armature and the bar which retards the rotation of the armature in a counterclockwise direction, and consequently the time interval involved in the opening of the contacts 120 and 121 is materially and predeterminedly lengthened. Obviously, this form of adjustable manual control provides for points intermediate of the two extremes mentioned. In other words, a device may be adjusted so as to predeterminedly assist or retard the action of the armature accordingly. If desired, a graduated dial may be used in conjunction with the bar or cam, and the desired time between the closing and opening of the contacts may be obtained within the limits of the operation of the device.

From the example of the invention described and illustrated it will be apparent that the invention provides an apparatus that will transform electrical energy into impulses for its operation in a convenient and efficient manner. It will also be apparent that the invention provides for the elimination of formation of arcs and the consequent damage thereto and also the tendency to vary the time duration of the apparatus to be electrically controlled, as for example, the camera shutter, the operation and control of which has been previously described. It will further be apparent that the invention provides a transformer that is capable of a relatively large instantaneous power output and still only involves a small power consumption from the electrical source. It will further be seen that the invention eliminates the necessity for using intricate spring operated timing switches with the above described attending disadvantages such as variance in speed of operation of camera shutters or other apparatus desired to be so electrically controlled.

I claim:

1. In combination in a camera a plurality of lenses, a self-contained leaf shutter unit for each of said lenses, and an electro-magnetic means for actuating each of said shutters to open position, means for providing a predetermined resistance to said shutter opening operation and means for providing an electric surge of sufficient magnitude to energize each of said electromagnets to overcome the resistance of said means for providing said resistance so as to cause each of said shutters to begin to open at the same instant, said means for providing said resistance being adapted to automatically close said shutters upon the expiration of a predetermined time interval.

2. In combination in a camera a plurality of lenses, a self-contained leaf shutter unit for each of said lenses, and an electromagnetic means for each of said shutters for directly actuating each of said shutters to the open position, means for providing a predetermined resistance to said shutter opening operation and means for providing an electric surge of sufficient magnitude to energize said electromagnets to overcome the resistance of said means for providing said resistance so as to cause said shutters to begin to open at the same instant, said electric surge being discharged in a time required to cause said shutters to be open for a predetermined time interval and of such magnitude as to energize said electromagnets to obtain substantially instantaneous opening of said shutters to the fully opened position, said means for providing said resistance being adapted to automatically close said shutters upon the expiration of said predetermined time interval.

3. In combination in a camera, a plurality of lenses, a self-contained leaf shutter unit for each of said lenses, and an electromagnetic means for directly actuating said shutters to open position, means for providing a predetermined resistance to said shutter opening operation and means for providing an electric surge of sufficient magnitude to energize said electromagnets to overcome the resistance of said means for providing said resistance so as to cause said shutters to begin to open at the same instant, said means for providing said electric surge requiring a relatively low source of current supply, said means for providing said resistance being adapted to automatically close said shutters upon the expiration of a predetermined time interval.

4. In combination in a camera, a plurality of lenses, a between-the-lens shutter unit for each of said lenses and a self-contained electromagnetic means for actuating each of said shutters to open position, means for providing a predetermined resistance to said shutter opening operation and means for providing an electric surge for energizing said electromagnets to overcome the resistance of said means for providing said resistance so as to cause said shutters to be fully opened substantially instantaneously and for maintaining said electric surge for a definite predetermined time interval, said means for providing said resistance being adapted to automatically close said shutters upon the expiration of said predetermined time interval.

5. In combination in a camera, a plurality of lenses, a between-the-lens shutter unit for each of said lenses and a self-contained electromagnetic device for actuating each of said shutters to open position, means for providing a predetermined resistance to said shutter opening operation and means for providing an electric surge for energizing said electromagnets to overcome the resistance of said means for providing said resistance so as to cause said shutters to be fully opened substantially instantaneously and for maintaining said electric surge for a definite predetermined time interval, and means for controlling the magnitude of the succeeding impulses of said electric surge, after the initial discharge, to avoid energizing said electromagnets sufficiently to cause a double exposure, said means for providing said resistance being adapted to automatically close said shutters upon the expiration of said predetermined time interval.

6. In combination in a camera, a plurality of lenses, a between-the-lens shutter for each of said lenses and a self-contained electromagnetic device for actuating each of said shutters, to open position, means for providing a predetermined resistance to said shutter opening operation and means for providing an electric surge for energizing said electromagnets to overcome the resistance of said means for providing said resistance so as to cause said shutters to be fully opened substantially instantaneously and for maintaining said electric surge for a definite predetermined time interval, and means for controlling the magnitude of the succeeding impulses of said electric surge, after the initial discharge, to avoid energizing said electromagnets sufficiently to cause a double exposure, said means comprising an electric circuit consisting of a switch for making and breaking said circuit, a condenser across said switch, a laminated iron core having a primary and a secondary winding, said secondary winding having a series of taps adapted to be used in different pairs by means of two manually operated arms, a second condenser of known capacitance indirectly connected across said electromagnets, said means for providing said resistance being adapted to automatically close said shutters upon the expiration of said predetermined time interval.

7. In combination an electromagnetic device, means including a surge timing system for creating an electric surge for actuating said device substantially instantaneously and for moving said device from an initial position to an actuated position and maintaining it in said actuated position for a definite predetermined time interval, and means for automatically returning said device to said initial position upon the expiration of said predetermined time interval.

8. In combination an electromagnetic device, means including a surge timing system for creating an electric surge for actuating said device substantially instantaneously and for moving said device from an initial position to an actuated position and maintaining it in said actuated position for a definite predetermined time interval and means for automatically returning said device to said initial position upon the expiration of said predetermined time interval and means for varying said predetermined time interval.

9. In combination in a camera, a plurality of lenses, a between-the-lens shutter for each of said lenses and a self-contained electromagnetic device for actuating each of said shutters to open position, means for providing a predetermined resistance to said shutter opening operation and means for providing an electric surge for energizing said electromagnets to overcome the resistance of said means for providing said resistance so as to cause each of said shutters to be fully opened substantially instantaneously and for maintaining said electric surge for a definite predetermined time interval said first named means being adapted to close said shutters substantially simultaneously after the expiration of said predetermined time interval.

10. An electromagnetic device of the switch-operating type having a pair of relatively movable switch contacts, a movable member for moving said contacts to open and close an electric circuit, a magnet for moving said member in one direction to close the contacts and for moving said member in the other direction to open the contacts, said magnet having magnetic circuits of relatively varying reluctance, means for producing a current for energizing said electromagnetic device, switch means for controlling the flow of current to said electromagnetic device, and means, under the influence of said current, whereby said movable member is moved to close said contacts and after a predetermined time interval to open said contacts, said electromagnetic device being capable of energization by a current of any value within a relatively wide range.

11. An electromagnetic device of the switch-operating type having a pair of relatively movable switch contacts, a movable member for moving said contacts to open and close an electric circuit, a magnet for moving said member in one direction to close the contacts and for moving said member in the other direction to open the contacts at a relatively high rate of speed, said magnet having magnetic circuits of relatively varying reluctance, means for producing a current for energizing said electromagnetic device, switch means for controlling the flow of current to said electromagnetic device, and means, under the influence of said current, whereby said movable member is moved to close said contacts and after a predetermined time interval to open said contacts, said electromagnetic device being capable of energization by a current of any value within a relatively wide range.

12. An electromagnetic device of the switch operating type having a pair of relatively movable switch contacts, a movable member for moving said contacts to open and close an electric circuit, a magnet for moving said member in one direction to close the contacts and for moving said member in the other direction to open the contacts at a uniform speed throughout a series of operations, said magnet having magnetic circuits of relatively varying reluctance, means for producing a current for energizing said electromagnetic device, switch means for controlling the flow of current to said electromagnetic device, and means, under the influence of said current, whereby said movable member is moved to close said contacts and after a predetermined time interval to open said contacts, said electromagnetic device being capable of energization by a current of any value within a relatively wide range.

13. An electromagnetic device having a pair of switch contacts adapted to be opened and closed, a movable member for opening and closing the contacts, two magnetic circuits in which are produced magnetic fluxes to create opposing and relatively varying pulls upon said member, a common winding for energizing said device, means for producing a current, and switch means for bringing said winding into circuit with said means for producing said current, said device adapted to operate on a current of any value within a relatively wide range, said device when energized being adapted to hold said switch contacts closed for a predetermined time interval and to automatically open said switch substantially instantaneously after said predetermined time interval.

14. In combination with an electromagnetic device, means including a surge timing system for creating an electric surge for actuating said device substantially instantaneously and for maintaining said device in said actuated position for a predetermined time interval, said means also including an electromagnetic switch-operating relay having a pair of switch contacts adapted to open and close an electric circuit for energizing said means for creating said electric surge, a movable member for opening and closing said contacts, two magnetic circuits in which are produced magnetic fluxes to create opposing and relatively varying pulls upon said member, a common winding for energizing said electromagnetic relay, means for producing a current, and switch means for bringing said winding into circuit with said means for producing said current, said switch-operating relay adapted to operate on a current of any value within a relatively wide range, said switch-operating relay being adapted to hold said switch contacts closed for a predetermined time interval and for automatically opening said switch contacts substantially instantaneously after said predetermined time interval.

15. In combination in a camera, a plurality of lenses, a between-the-lens shutter for each of said lenses and a self-contained electromagnetic device for actuating each of said shutters to open position, means for providing an electric surge for energizing said electromagnets to cause said shutters to open substantially instantaneously and for maintaining said electric surge for a definite predetermined time interval, said means also including an electromagnetic switch-operating relay having a pair of switch contacts adapted to open and close an electric circuit for energizing said means for creating said electric surge, a movable member for opening and closing said contacts, two magnetic circuits in which are produced fluxes to create opposing and relatively varying pulls upon said member, a common winding for energizing said electromagnetic relay, means for producing a current, and switch means for bringing said winding into circuit with said means for producing said current, said switch-operating relay adapted to operate on a current of any value within a relatively wide range, said switch-operating relay adapted to hold said switch contacts closed for a predetermined time interval and for automatically opening said switch contacts substantially instantaneously after said predetermined time interval and means for automatically closing said shutters upon the expiration of said predetermined time interval.

16. In combination in a camera, a plurality of lenses, a between-the-lens shutter for each of said lenses and a self-contained electromagnetic device for actuating each of said shutters to open position, means for providing an electric surge for energizing said electromagnets to cause said shutters to be fully opened substantially instantaneously and for maintaining said electric surge for a definite predetermined time interval, and means whereby the impulse of said electric surge never reaches a point of sufficient magnitude, after the initial discharge, to again energize said electromagnets and thus cause a double exposure, an electromagnetic switch-operating relay having a pair of switch contacts adapted to open and close an electric circuit for energizing said means for creating said electric surge, a movable member for opening and closing said contacts, two magnetic circuits in which are produced magnetic fluxes to create opposing and relatively varying pulls upon said member, a common winding for energizing said electromagnetic relay, means for producing a current, and switch means for bringing said winding into circuit with said means for producing said current, said switch-operating relay adapted to operate on a current of any value within a relatively wide range, said switch-operating relay being adapted to hold said switch contacts closed for a predetermined time interval for energizing said first named means and for automatically opening said switch contacts substantially instantaneously after said predetermined time interval to create said electric surge of sufficient magnitude to energize said electromagnets to cause said shutters to be fully opened substantially instantaneously, and means for automatically closing said shutters upon the expiration of said predetermined time interval.

17. In combination in a camera a plurality of lenses, a self-contained leaf shutter unit for each of said lenses, and an electromagnetic means for actuating each of said shutters to open position, means for providing a predetermined resistance to said shutter opening operation and means for providing an electric surge of sufficient magnitude to energize each of said electromagnets to overcome the resistance of said means for providing said resistance so as to cause each of said shutters to begin to open at the same instant, said means for providing said resistance being adapted to become automatically effective upon a fall in magnitude of said electric surge below a predetermined value to close said shutters.

18. In combination in a camera a plurality of lenses, a self-contained leaf shutter unit for each of said lenses, and an electromagnetic means for each of said shutters for directly actuating each of said shutters to the open position, means for providing a predetermined resistance to said shutter opening operation and means for providing an electric surge of sufficient magnitude to energize said electromagnets to overcome the resistance of said means for providing said resistance as to cause said shutters to begin to open at the same instant, said electric surge being discharged in a time required to cause said shutter to be open for a predetermined time and of such magnitude as to energize said electromagnets to obtain substantially instantaneous opening of said shutters to the fully opened position, said means for providing said resistance being automatically effective, upon a fall in magnitude of said electric surge below a predetermined value, to close said shutters.

19. In combination in a camera a plurality of lenses, a self-contained leaf shutter unit for each of said lenses, and an electromagnetic means for directly actuating said shutter to open position, means for providing an electric surge of sufficient magnitude to energize said electromagnets for actuating said shutters, and means for closing said shutters.

20. In combination in a camera, a plurality of lenses, a self-contained leaf shutter unit for each of said lenses, and an electromagnetic means for directly actuating said shutter to open position, means for providing a predetermined resistance to said shutter opening operation and means for providing an electric surge of sufficient magnitude to energize said electromagnets to overcome the resistance of said means for providing said resistance so as to cause said shutters to begin to open at the same instant, said means requiring a relatively low source of current supply, said means for providing said resistance being automatically effective upon a fall in magnitude of said electric surge below a predetermined value to close said shutters.

21. In combination in a camera, a plurality of lenses, a between-the-lens leaf shutter and a self-contained electromagnetic device for actuating each of said shutters, means for providing an electric surge for energizing said electromagnets to cause said shutters to be fully opened substantially instantaneously and for maintaining said electric surge for a definite predetermined time interval, means for closing said shutters upon the expiration of said predetermined time interval and means whereby the impulse of said electric surge never reaches a point of sufficient magnitude, after the initial discharge, to again energize said electromagnets and thus cause a double exposure, an electromagnetic switch-operating relay having a pair of switch contacts adapted to open and close an electric circuit for energizing said means for creating said electric surge, a movable member for opening and closing said contacts, two magnetic circuits in which are produced magnetic fluxes to create opposing and relatively varying pulls upon said member, a common winding for energizing said electromagnetic relay, means for producing a current, and switch means for bringing said winding into circuit with said means for producing said current, said switch operating relay being adapted to operate on a current of any value within a relatively wide range, said switch-operating relay being adapted to hold said switch contacts closed for a predetermined time interval for energizing said first named means and for automatically opening said switch contacts substantially instantaneously, after said predetermined time interval.

22. In combination in a camera, a plurality of lenses, a between-the-lens shutter for each of said lenses, and a self-contained electromagnetic device for actuating each of said shutters to open position, means for providing a predetermined resistance to said shutter opening operation and means for providing an electric surge for energizing said electromagnets to overcome the resistance of said means for providing said resistance so as to cause said shutters to be fully opened substantially instantaneously and for maintaining said electric surge for a definite predetermined time interval said means for providing said resistance being adapted to automatically close said shutters substantially instantaneously after the expiration of said predetermined time interval.

23. An electromagnetic device of the switch operating type, having a pair of relative movable switch contacts, a movable member for moving said contacts to open and close an electric circuit, a magnet for moving said member in one direction to close the contacts, and for moving said member in the other direction to open the contacts, said magnet having magnetic circuits of relatively varying reluctance, means for producing a current for energizing said electromagnetic device, switch means for controlling the flow of current to said electromagnetic device, and means under the influence of said current whereby said movable member is moved to close said contacts and after a predetermined time interval to open said contacts, said electromagnetic device being capable of energization by a current of any value within a relatively wide range, and means for varying the time interval involved in the opening and closing of said contacts.

24. An electromagnetic device of the switch operating type, having a pair of relative movable switch contacts, a movable member for moving said contacts to open and close an electric circuit, a magnet for moving said member in one direction to close the contacts, and for moving said member in the other direction to open the contacts, said magnet having magnetic circuits of relatively varying reluctance, means for producing a current for energizing said electromagnetic device, switch means for controlling the flow of current to said electromagnetic device, and means under the influence of said current whereby said movable member is moved to close said contacts and after a predetermined time interval to open said contacts, said electromagnetic device being capable of energization by a current of any value within a relatively wide range, and means for varying the time interval involved in the opening and closing of said contacts, said means comprising an adjustable member for creating a fringing flux for assisting or retarding the opening and closing of said contacts.

25. In combination in a camera, a shutter, an electromagnetic means for actuating said shutter to open position, means for providing an electric surge for energizing said electromagnetic means so as to cause said shutter to be fully opened substantially instantaneously and for maintaining said electric surge for a definite predetermined time interval and means for automatically closing said shutter upon the expiration of said predetermined time interval.

26. In combination in a camera, a shutter, an electromagnetic means for directly actuating said shutter to open position, means for providing a predetermined resistance to said shutter opening operation and means for providing an electric surge for energizing said electromagnet to overcome the resistance of said means for providing said resistance so as to cause said shutter to be fully opened substantially instantaneously and for maintaining said electric surge for a definite predetermined time interval, said means for providing said resistance being adapted to automatically close said shutter after the expiration of said predetermined time interval, and means for varying said time interval.

27. A single electromagnetic device having a pair of switch contacts adapted to be opened and closed, a movable member for opening and closing the contacts, means for producing a current for energizing said electromagnetic device, manually operable switch means for controlling the flow of current to said electromagnetic device, and means, under the influence of said current, whereby said movable member is moved to close said contacts and after a predetermined time interval to open said contacts irrespective of the duration of time said manually operated switch remains closed beyond the time required to completely energize said device.

HERBERT C. ROTERS.